Aug. 1, 1933.  H. L. STALEY  1,920,220
AERATING DEVICE
Filed Feb. 13, 1931
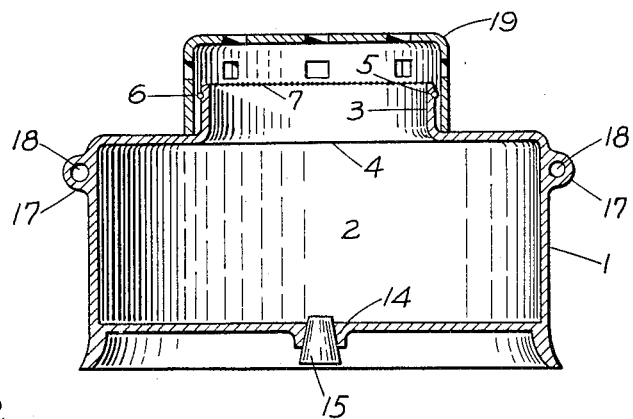
Fig. 1
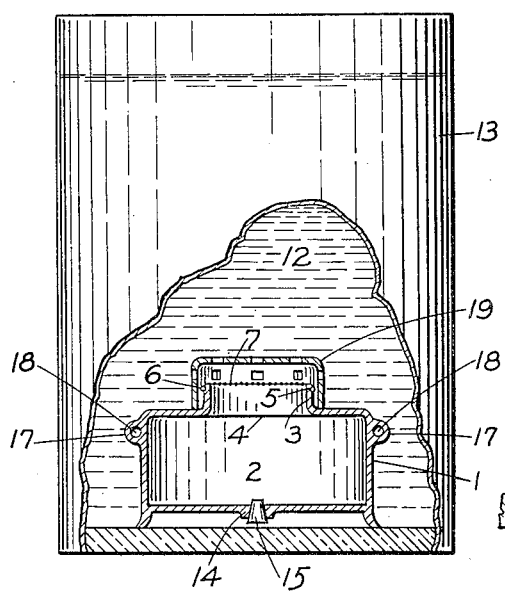
Fig. 2
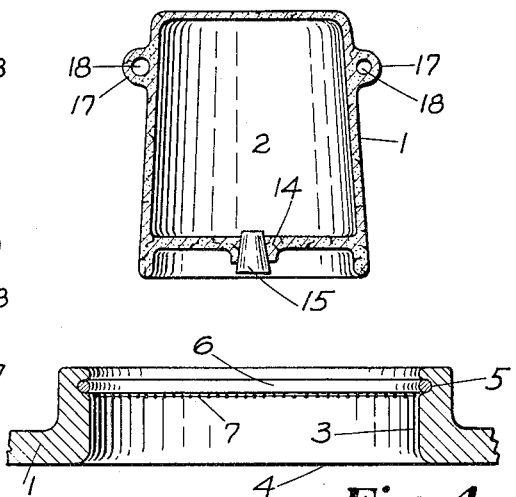
Fig. 3
Fig. 4
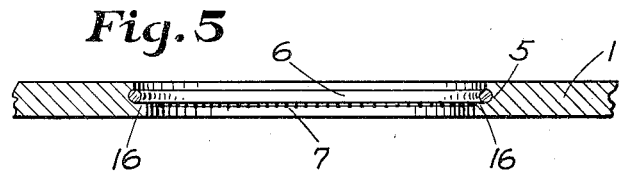
Fig. 5
INVENTOR.
Harrison L. Staley

UNITED STATES PATENT OFFICE 1,920,220

AERATING DEVICE

Harrison L. Staley, Martinsville, Ind.

Application February 13, 1931. Serial No. 515,552

6 Claims. (Cl. 119—5.)

This invention relates to a type of aerator adapted particularly to aerating the various types of live fish containers which are commonly known to the trade as display aquariums for dealers, home aquariums and shipping cans for producers, where it is often impractical to have outside connections with a current of air under pressure or flowing water.

Heretofore, efforts have been made to aerate shipping cans for live fish by providing a manually operated air pump secured to the side of the can to force air bubbles through the water therein. But such a device has been found of questionable utility, for the reason, that pressure produces rapid movement of air bubbles through the water and that a continuous flow of air is necessary to keep the water regularly and evenly charged with dissolved air. And further, the element of labor which is required for the operation of such a device makes the operation uncertain and the expense prohibitive.

But the necessity of proper aeration of shipping cans has been clearly established if great losses of live fish are to be avoided. A practical shipping can holds only a few gallons of water and because of the shipping expense hundreds of live fish are placed therein. Dissolved air in the water is soon reduced to extreme rarefication and not infrequently the entire shipment of fish is suffocated. Especially is this true if the temperature of water in the shipping can is raised more than a few degrees in transit or the fish have not been properly conditioned by gradually reducing their air and food rations prior to shipment. In any event, the fish that survive such shipment are stunted and when placed in dealers' display aquariums seldom if ever, recover their native vigor.

The small home aquarium for which no method of aeration has heretofore been found practical, contributes further suffocation to the fish to which must be added a degree of starvation. It has been determined, that if a pet fish is placed in a small aquarium from which air is slowly extracted from the water either by itself or by mechanical means, a physical condition soon arises which causes death if more than mere life sustaining quantities of food are given it. The fact is also well known to the trade that frequent changes of water in the home aquarium when the fish is underfed produce death. Therefore, the pet fish trade universally advises minute and infrequent feedings and particularly infrequent changes of water. But even with the most skillful balancing of the air and food ration, pet fish seldom survice longer than ninety days and the trade estimates thirty days as their average life in a small home aquarium.

The display aquariums which dealers use to exhibit their fish are aerated at the present time by two methods. One method, by having a continuous flow of fresh water into it, the surplus water being carried off by an overflow vent; the other, by having an electrically operated air pump discharging air under pressure into the water. Either method entails great expense of installation and operation.

In my experimentation, I have found that if the water is properly aerated in the several epochs of a pet fish's existence, food in greater quantities can be given it and its life indefinitely prolonged, thus preventing a loss of millions of pet fish annually in the United States.

Basing my research upon the established fact in physical chemistry, that fifty parts of distilled water at 60 to 70 degrees Fahr., dissolves only one part air, I discovered, that if an isolated air chamber having a permeable wall of desired porosity was placed below the surface of water in a vessel containing live fish, sufficient air was gradually released by the process of osmosis to keep the water evenly charged with dissolved air.

It is therefore the object of my invention to provide a simple, inexpensive and automatic aerating device which effectively aerates water in a live fish container without recourse to a mechanical compressor for its air supply.

With these and other desirable objects in view, attention is directed to the accompanying drawing which forms a part of this specification.

Figure 1 is a longitudinal section of my invention for home aquariums; Figure 2 discloses a small home aquarium with walls partly removed showing my invention in longitudinal section, in operative position; Figure 3 is a longitudinal section of the simplest form of my invention; Figure 4 is a fragmentary section of the body of my invention showing a modified method of attaching the permeable member to the neck of the body; Figure 5 is also a fragmentary section of the body showing the method of attaching a permeable member in the wall of the body.

Referring to the preferred form of my invention for home aquariums, (Figs. 1 and 2) the numeral 1 designates the body of the aerating device which I have found practical to make of various materials, such as earthenware, metal, glass, etc. Body 1 is provided with an isolated air chamber 2 for holding a quantity of air under the surface of the water 12 in container 13. Said body 1 is further provided with a projecting neck 3 which defines circular opening 4, said neck having an annular groove 5 thereon to afford facilities for housing the binding element 6 which removably secures permeable material 7 over said opening 4.

It is obvious that osmosis takes place through permeable material 7 and that, as air is dissolved by water 12 in container 13, water replaces the air in chamber 2 and that when the air is exhausted from chamber 2, the accumulated water therein has only to be removed to re-establish the device as an active aerator.

For draining the water from chamber 2 after osmosis has occurred, a hole 14 is provided, preferably at the bottom of the aerating device. Said hole 14 should be made closable to prevent large air bubbles from escaping therethrough should the device be tilted out of a vertical position while being introduced into the water. Any suitable means may be employed to close hole 14, such as a tapered stopper 15.

In the care of pet fish it has been found inadvisable to place the hand in the water of containers 13 because of the oils and acids thereon, such foreign matter being injurious to fish life, and as it is necessary to remove from time to time the aerator, from the container 13 to drain the water from the air chamber 2, projecting ears 17 with holes 18 therein are fixedly secured on body 1 for the introduction of a hook or string to remove the aerator from the container.

For permeable element 7, I have found by experimentation that earthenware and other rigid porous materials are suitable, but I prefer to use a closely woven pliable fabric because it yields itself readily to cleansing, and cleansing of everything in a fish container is necessary from time to time as a health factor. When a rigid material is used for permeable element 7, the minute pores therein, which are in fixed relation to each other, soon become filled with silt and other waste material peculiar to pet fish containers and such material is very difficult to remove. The disadvantage of using a rigid porous material is observed when the entire aerator is made of such material which is illustrated in Figure 3.

When a closely woven pliable fabric is used for permeable element 7, the rate of osmosis can be changed by the simple expedient of increasing or decreasing the layers of said fabric.

If, under certain conditions, a rigid porous material is required for permeable element 7, means for securing such rigid material to the aerator is suggested in Figure 5. Instead of using the annular groove 5 to house a pliable binding element 6, said groove can be utilized for locking a plastic sealing material in the form of an insoluble wax or cement around and above a tapered outer edge of a rigid porous element 7. For holding such a rigid element 7 in position while sealing material is being applied, an inwardly jutting shoulder 16 is provided.

Regardless of what kind of porous material is used for permeable element 7, it is well understood that it must be of such texture that a water film will be formed across the interstices so that free air cannot escape in visible bubbles therethrough for such action would soon exhaust the air supply in chamber 2. I have found that the finer and more numerous the pores in said permeable element, the more rapid the rate of osmosis. Permeable element 7 becomes in fact, a medium in which both air and water are broken up in the most minute particles, the air to be dissolved by osmosis and diffused through the body of water 12, while small quantities of water by the action of gravitation are permitted to replace the air extracted from air chamber 2.

I find it necessary when a pliable woven fabric is used for permeable element 7 for its outer edge to be bound securely in annular groove 5 to prevent free air from escaping between the bottom of said groove and binding element 6. For binding element 6, a soft metal wire which allows the ends to be twisted, an overlapping metal spring clasp or twine cord can be utilized.

It has been determined that as air from chamber 2 is dissolved by water 12, its rapidity of diffusion is observably slow. I have found however, that the movement of fish in container 13 agitates the water sufficiently to distribute rapidly the dissolved air through the entire body.

When a fibrous material is used for permeable element 7 and openly exposed to fish, I find they frequently nibble at it to such an extent that it is permanently injured. To prevent such damage, a perforated guard 19 is provided, said guard being formed out of a screen wire or any other suitable material. It is necessary that guard 19 should completely cover permeable element 7 in such a manner that it will not interfere with the diffusion of dissolved air. It is apparent that guard 19 can be removably attached by any practical means to body 1.

In forms for home aquariums, my invention can be embodied in various sizes and decorative shapes such as castles, turtles, frogs, submarines, etc., without interfering with the scope of my invention.

In operation, the aerating device is drained of all water, the hole 14 closed, and it is then placed in the aquarium below the surface of water 12. Should said water be not completely saturated with dissolved air, osmosis immediately sets in and continues as long as dissolved air is extracted by pet life or until the free air in chamber 2 is exhausted. After air is exhausted from chamber 2, water is drained therefrom which again restores the device as an active aerator. It is readily observed that the aerator, should have greater weight than the water it displaces so that it will be held by gravity on the bottom of the aquarium.

In my experimentation, I have found that if the temperature of water 12 in container 13 is greatly increased, dissolved air therein is driven rapidly from the water, and that such a rise of temperature with its attending rarefication of dissolved air, often produces death to pet fish. My invention, however, provides for this contingency; osmosis increases in proportion to the rise in temperature.

Having fully described the principle of my invention, I claim as new:

1. An aerating device for live fish containers, comprising a body having an isolated air chamber therein, an opening in the wall of said body, a projecting neck defining said opening, said projecting neck being provided with an annular groove thereon, a permeable element adapted to cover said opening, means to lockingly secure the outer edge of said permeable element in the annular groove of said projecting neck, and a second closable hole in said body to drain the water from said air chamber after osmosis has occurred through said permeable element between the air in said chamber and water in said container.

2. An aerating device for live fish containers, comprising a body having an isolated air chamber therein, an opening in the wall of said body, a projecting neck defining said opening, said projecting neck being provided with an annular groove thereon, a permeable element adapted to cover said opening and permit osmosis between the air in said chamber and water in said container, means to lockingly secure the outer edge of said permeable element in the annular groove of said projecting neck, said means consisting of a pliable binding element, and a hole to drain the water from said air chamber after osmosis has occurred.

3. The combination of an aerated fish container, comprising a vessel to hold water, a body adapted to be held below the surface of the water having an isolated air chamber therein, projecting ears on said body, a permeable element secured in the wall of said body to permit osmosis between the air in said chamber and water in said container, and a hole in said body to drain the water from said air chamber after osmosis has occurred, substantially as described.

4. An aerating device for live fish containers, comprising a body having an isolated air chamber therein, and a pliable permeable element secured in the wall of said body to permit osmosis between the air in said chamber and the water in said container, substantially as described.

5. An aerating device for live fish containers, comprising a body having an isolated air chamber therein, an opening in the wall of said body, a pliable permeable element secured over said opening to permit osmosis between the air in said chamber and the water in said container, substantially as described.

6. An aerating device for live fish containers, comprising a body having an isolated air chamber therein, an opening in the wall of said body, a pliable permeable element removably secured over said opening, said pliable permeable element permitting osmosis between the air in said chamber and the water in said container, and a removable plug located in the wall of said body, substantially as described.

HARRISON L. STALEY.